US008331434B2

(12) United States Patent
Han

(10) Patent No.: US 8,331,434 B2
(45) Date of Patent: Dec. 11, 2012

(54) METHOD AND APPARATUS FOR VIDEO CODING, PREDECODING, AND VIDEO DECODING FOR VIDEO STREAMING SERVICE, AND IMAGE FILTERING METHOD

(75) Inventor: Woo-jin Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1616 days.

(21) Appl. No.: 11/071,102

(22) Filed: Mar. 4, 2005

(65) Prior Publication Data

US 2005/0195899 A1 Sep. 8, 2005

Related U.S. Application Data

(60) Provisional application No. 60/549,544, filed on Mar. 4, 2004.

(30) Foreign Application Priority Data

Apr. 2, 2004 (KR) .................... 10-2004-0022985

(51) Int. Cl.
*H04N 7/12* (2006.01)
(52) U.S. Cl. ......... 375/240.01; 375/240.12; 375/240.13; 375/240.14; 375/240.15; 375/240.26
(58) Field of Classification Search ............. 375/240.01, 375/240.12–240.15, 240.26
See application file for complete search history.

(56) References Cited

U.S. PATENT DOCUMENTS

| | | | | |
|---|---|---|---|---|
| 5,818,533 A | * | 10/1998 | Auld et al. ............... | 375/240.14 |
| 5,841,473 A | * | 11/1998 | Chui et al. ............... | 348/390.1 |
| 6,233,017 B1 | * | 5/2001 | Chaddha ................. | 375/240.12 |
| 6,275,616 B1 | | 8/2001 | Jahanghir et al. | |
| 2003/0086622 A1 | | 5/2003 | Klein Gunnewiek et al. | |

FOREIGN PATENT DOCUMENTS

| | | |
|---|---|---|
| CN | 1203500 A | 12/1998 |
| JP | 9-163362 A | 6/1997 |
| JP | 11-18085 A | 1/1999 |
| JP | 2001-309378 A | 11/2001 |
| JP | 2002-100994 A | 4/2002 |
| KR | 0151212 B1 | 6/1998 |
| KR | 1999-0082104 A | 11/1999 |
| KR | 2003-0026109 A | 3/2005 |

(Continued)

OTHER PUBLICATIONS

Andreopoulos et al "Spatio-Temporal-SNR Scalable Wavelet Coding With Motion Compensated DCT Base-Layer Architectures" Proceedings of the 2003 International Conference on Image Processing. IEEE, New York, NY. vol. 2. Sep. 14, 2003.

(Continued)

*Primary Examiner* — Sath V Perungavoor
*Assistant Examiner* — Geepy Pe
(74) *Attorney, Agent, or Firm* — Sughrue Mion, PLLC

(57) ABSTRACT

A method and apparatus for video encoding, predecoding, and video decoding for video streaming services. The video encoding method includes encoding first and second video sequences into first and second bitstreams using scalable video coding, wherein at least one of resolution, frame rate, and image quality of the second video sequence is different from that of the first video sequence, and combining the first and second bitstreams into a super bitstream.

7 Claims, 10 Drawing Sheets

FOREIGN PATENT DOCUMENTS

| KR | 10-2005-0038732 A | 4/2005 |
|---|---|---|
| KR | 10-2005-0049644 A | 5/2005 |
| WO | WO 02/01881 A2 | 1/2002 |
| WO | 02/054776 A1 | 7/2002 |
| WO | WO 03/075578 A2 | 9/2003 |

OTHER PUBLICATIONS

Radha et al "Scalable Internet Video Using MPEG-4" Signal Processing: Image Communication. Elsevier Science Publishers, Amsterdam, NL. vol. 12, No. 1-2. Sep. 1, 1999.

Benzler, Ulrich "Spatial Scalable Video Coding Using a Combined Subband-DCT Approach" IEEE Transactions on Circuits and Systems for Video Technology, IEEE Service Center, NJ, US. vol. 10, No. 7. Oct. 1, 2000.

Woo-Jin Han, et al., "Performance improvement of wavelet-based scalable video coder based on pre-decoder side rate-distortion optimization" Processing of the 3$^{rd}$ IEEE International Symposium on Signal Processing and Information Technology, pp. 211-214, Dec. 14-14, 2003.

M. Van Der Schaar, et al., "A novel MPEG-4 based hybrid temporal-SNR scalability for Internet video", Proceedings. 2000 International Conference on Image Processing, vol. 3, pp. 548-551, Sep. 10-13, 2000.

Feng Wu, et al., "Efficient and universal scalable video coding", Proceedings. 2002 International Conference on Image Processing, vol. 2, pp. II-37-40, Sep. 22-25, 2002.

Gregory J Conklin et al: "Video Coding for Streaming Media Delivery on the Internet" IEEE Transactions on Circuits and Systems for Video Technology, IEEE Service Center, Piscataway, NJ, US, vol. 11, No. 3, Mar. 1, 2001, XP011014170ISSN: 1051-8215.

Office Action issued on Jul. 16, 2010 in counterpart European Application No. 05726866.6.

Canadian Office Action issued on May 25, 2011 in the corresponding Canadian Patent Application No. 2,557,294.

Communication dated Dec. 27, 2010 from the State Intellectual Property Office of P.R. China in a counterpart application No. 200580006645.5.

Japanese Office Action, dated Oct. 4, 2011, issued in corresponding Japanese Application No. 2007-501705.

Schwarz, Heiko et al. "SNR-scalable Extension of H.264/AVC." Joint Video Team of ISO/IEC MPEG & ITU-T VCEG. 10th Meeting: Waikoloa, Hawaii, USA. Dec. 8-12, 2003. p. 1-20.

Communication dated May 8, 2012 issued by the Japanese Patent Office in corresponding Japanese Application No. 2010-110658.

* cited by examiner

NON-SCALABLE VIDEO CODING SCHEME

SCALABLE VIDEO CODING SCHEME

FIRST ILLUSTRATIVE EMBODIMENT

SECOND ILLUSTRATIVE EMBODIMENT

METHOD AND APPARATUS FOR VIDEO CODING, PREDECODING, AND VIDEO DECODING FOR VIDEO STREAMING SERVICE, AND IMAGE FILTERING METHOD

CROSS-REFERENCE TO RELATED APPLICATIONS

This application claims priority from Korean Patent Application No. 10-2004-0022985 filed on Apr. 2, 2004 in the Korean Intellectual Property Office, and U.S. Provisional Patent Application No. 60/549,544 filed on Mar. 4, 2004 in the United States Patent and Trademark Office, the disclosures of which are incorporated herein by reference in their entirety.

BACKGROUND OF THE INVENTION

1. Field of the Invention

The present invention relates to a method and apparatus for video encoding, predecoding, and reconstructing the original video sequence for video streaming services, a bitstream structure, and an image filtering method.

2. Description of the Related Art

With the development of information communication technology including the Internet, a variety of communication services have been newly proposed. One among such communication services is a Video On Demand (VOD) service. Video on demand refers to a service in which a video content such as movies or news is provided to an end user over a telephone line, cable or Internet upon the user's request. Users are allowed to view a movie without having to leave their residence. Also, users are allowed to access various types of knowledge via moving image lectures without having to go to school or private educational institutes.

Various requirements must be satisfied to implement such a VOD service, including wideband communications and motion picture compression to transmit and receive a large amount of data. Specifically, moving image compression enables VOD by effectively reducing bandwidths required for data transmission. For example, a 24-bit true color image having a resolution of 640×480 needs a capacity of 640×480× 24 bits, i.e., data of about 7.37 Mbits, per frame. When this image is transmitted at a speed of 30 frames per second, a bandwidth of 221 Mbits/sec is required to provide a VOD service. When a 90-minute movie based on such an image is stored, a storage space of about 1200 Gbits is required. Accordingly, since uncompressed moving images require a tremendous bandwidth and a large capacity of storage media for transmission, a compression coding method is a requisite for providing the VOD service under current network environments.

A basic principle of data compression is removing data redundancy. Motion picture compression can be effectively performed when the same color or object is repeated in an image, or when there is little change between adjacent frames in a moving image.

Known video coding algorithms for motion picture compression include Moving Picture Experts Group (MPEG)-1, MPEG-2, H.263, and H.264 (or AVC). In such video coding methods, temporal redundancy is removed by motion compensation based on motion estimation and compensation, and spatial redundancy is removed by Discrete Cosine Transformation (DCT). These methods have high compression rates, but they do not have satisfactory scalability since they use a recursive approach in a main algorithm. In recent years, research into data coding methods having scalability, such as wavelet video coding and Motion Compensated Temporal Filtering (MCTF), has been actively carried out. Scalability indicates the ability to partially decode a single compressed bitstream at different quality levels, resolutions, or frame rates.

FIG. 1 illustrates the configuration of a video streaming service provider 100 using a video coding scheme supporting low scalability. For convenience of explanation, a video streaming service for a single video sequence will be described.

Referring to FIG. 1, the video streaming service provider 100 receives a video sequence and performs video coding on the video sequence using a coding algorithm such as MPEG-1, MPEG-2, H.263, or H.264. A bitstream obtained by coding the video sequence with these coding algorithms is not scalable or supports little scalability. Thus, to provide video streaming services at various spatial resolutions and frame rates, a bitstream needs to be generated for each resolution and frame rate. To accomplish this, the video streaming service provider 100 includes a plurality of converters 110-2 through 110-n, each converting a video sequence into another video sequence with a lower spatial resolution and (or) a lower frame rate, a plurality of encoders 120-1 through 120-n encoding the video sequence or the video sequences subjected to conversion with a video coding algorithm into bitstreams, and a selector 130 selecting one of the bitstreams with different spatial resolutions and frame rates for transmission to a video decoder 140.

More specifically, a second converter 110-2 converts the received video sequence into a video sequence with a lower spatial resolution or (and) a lower frame rate by performing downsampling or frame rate reduction. MPEG-based downsampling results in smooth images. The resulting video sequence is then sent to a second video encoder 120-2. Similarly, a third converter 110-3 converts the video sequence and sends the resulting sequence to a third video encoder 120-3, and an n-th converter 110-n transmits the video sequence to an n-th video encoder 120-n after conversion.

A first video encoder 120-1 performs video coding on the video sequence at the highest spatial resolution and highest frame rate. For example, the first video encoder 120-1 may receive the video sequence with 704×576 resolution and 60 Hz frame rate and encode the video sequence into a bitstream with 704×576 resolution and 60 Hz frame rate. The bitstream obtained by coding while maintaining the same resolution and frame rate as the original video sequence can be provided to a user when a sufficient network bandwidth is available to support it. For example, if 6 Mbps network bandwidth is stably available, the bitstream generated by the first video encoder 120-1 can be provided to the user. The bitstream provided to the user is decoded by the video decoder 140 to reconstruct the original video sequence with 704×576 resolution and 60 Hz frame rate.

The second video encoder 120-2 encodes a video sequence with a lower spatial resolution and (or) a lower frame rate than that encoded by the first video encoder 120-1 into a bitstream. Similarly, the third video encoder 120-3 performs video encoding at different spatial resolution and (or) frame rate than the first and second video encoders 120-1 and 120-2 and generates a bitstream. In this way, the first through the n-th video encoders 120-1 through 120-n generate bitstreams with different spatial resolutions and (or) frame rates from the same video sequence.

The selector 130 provides a bitstream having a spatial resolution and a frame rate requested by the user (video decoder 140) to the video decoder 140. When a sufficient network bandwidth is available, the user can make a request for a video with a high spatial resolution and a high frame rate, and the video streaming service provider 100 delivers a bitstream with the high spatial resolution and the high frame rate selected by the user to the user. If the network bandwidth is not stable, a video sequence reconstructed by the video decoder 130 from a bitstream coded at high resolution and high frame rate can be easily disrupted during playback. In this case, the user can request a bitstream coded at lower resolution and (or) lower frame rate from the video streaming service provider 100.

The video decoder 140 receives a bitstream corresponding to each video sequence from the video streaming service provider 100 for decoding. For example, in order to reconstruct a video sequence, an MPEG-2 coded bitstream can be decoded using an MPEG-2 decoding algorithm while an H.264 coded bitstream can be decoded using H.264 decoding scheme.

A video streaming service provider using non-scalable or low scalability video coding algorithm like in FIG. 1 must perform a plurality of video coding processes on the same video sequence with various spatial resolutions and frame rates according to network environment or user's request. As a result, a plurality of bitstreams are generated for the same video sequence. Generating a bitstream at each resolution and frame rate requires a great deal of computational capacity. Furthermore, services delivering video streams to users at various spatial resolutions and frame rates, which are commonly known as simulcasting services, require high capacity storage media for storing generated bitstreams.

FIG. 2 schematically illustrates the configuration of a video streaming service provider 200 using a wavelet-based scalable video coding scheme. For convenience of explanation, video coding for a single video sequence will be described.

Referring to FIG. 2, the video streaming service provider 200 includes a scalable video encoder 210 encoding a video sequence and a predecoder 220. The scalable video encoder 210 uses a video coding algorithm having scalability to generate a scalable bitstream. In currently known scalable video coding algorithms, spatial scalability can be attained by wavelet transform, temporal scalability can be attained by Motion Compensated Temporal Filtering (MCTF), unconstrained MCTF (UMCTF) or Successive Temporal Approximation and Referencing (STAR), and Signal to Noise Ratio (SNR) scalability can be attained by embedded quantization.

The bitstream obtained by encoding the video sequence through the scalable video encoder 210 is predecoded by the predecoder 220. Predecoding is a process of truncating some bits of a scalable bitstream. The bitstream may be predecoded into a bitstream with a lower spatial resolution, a lower frame rate, or a lower image quality than an original bitstream. When the video decoder 230 at the user side requests a video sequence with specific resolution and frame rate from the video streaming service provider 200, the predecoder 220 in the video streaming service provider 200 truncates some bits of the bitstream and transmits the resulting bitstream to the video decoder 230. The video decoder 230 decodes the bitstream and reconstructs a video sequence with the requested resolution and frame rate.

Using a scalable video coding algorithm for a video streaming service in this way allows simulcasting of a single bitstream obtained from a single video sequence at various resolutions and frame rates. However, currently known scalable video coding algorithms do not offer high quality bitstreams at all resolutions. For example, the highest resolution video can be reconstructed with high quality, but a low resolution video cannot be reconstructed with satisfactory quality. More bits can be allocated for video coding of the low resolution video to improve its quality. However, this will degrade the coding efficiency.

As described above, the video streaming service shown in FIG. 1 can provide a bitstream optimized at every resolution, but may waste computational capacity and storage space. On the other hand, the video streaming service shown in FIG. 2 is able to provide bitstreams having various resolutions and frame rates using a single bitstream, but may offer poor image quality at some resolutions or degrade coding efficiency to improve image quality. Therefore, there is an urgent need for a video coding scheme for video streaming service delivering satisfactory image quality and high video coding efficiency by achieving a good trade-off between the coding efficiency and reconstructed image quality.

SUMMARY OF THE INVENTION

The present invention provides a method and apparatus for video encoding, predecoding, and video decoding for video streaming services.

The present invention also provides a method for increasing the efficiency of a video coding algorithm for video streaming services.

The present invention also provides a method for improving the image quality of a video sequence provided by a video streaming service.

The above stated object as well as other objects, features and advantages, of the present invention will become clear to those skilled in the art upon review of the following description, the attached drawings and appended claims.

According to an aspect of the present invention, there is provided a video encoding method including encoding first and second video sequences into first and second bitstreams using scalable video coding, wherein at least one of resolution, frame rate, and image quality of the second video sequence is different from that of the first video sequence; and combining the first and second bitstreams into a super bitstream.

According to another aspect of the present invention, there is provided a video encoding method including encoding first through n-th video sequences into first through n-th bitstreams wherein n is a natural number greater than 1 and at least one of resolution, frame rate, and image quality of each of the second through the n-th video sequences is different from that of the first video sequence, and combining the first through the n-th bitstreams together into a super bitstream.

According to still another aspect of the present invention, there is provided a super bitstream format comprising a first bitstream generated by encoding a first video sequence having the highest resolution, and second through n-th bitstreams generated by respectively encoding second through n-th video sequences having resolution, frame rate, and image quality, at least one of which is different from that of the first video sequence where n is a natural number greater than 1.

According to yet another aspect of the present invention, there is provided a video encoder including a video encoding unit encoding first through n-th video sequences wherein at least one of resolution, frame rate, and image quality of each of the second through the n-th video sequences is different from that of the first video sequence, and a super bitstream generator generating a super bitstream including the first through n-th bitstreams generated by the video encoding unit and necessary header information.

According to a further aspect of the present invention, there is provided a predecoding method including receiving a request for a video sequence with predetermined resolution, frame rate, and image quality, truncating a portion of a super bitstream including a plurality of bitstreams with different resolutions and frame rates associated with the requested video sequence, so that the super bitstream has the same resolution, frame rate, and image quality as requested, and transmitting the resulting super bitstream to a decoder.

According to still another aspect of the present invention, there is provided a predecoder including a request receiver receiving a request for a video sequence with predetermined resolution, frame rate, and image quality, a super bitstream truncating portion truncating a portion of a super bitstream including a plurality of bitstreams with different resolutions and frame rates associated with the requested video sequence, so that the super bitstream has the same resolution, frame rate, and image quality as requested, and a transmitter sending the resulting super bitstream to a decoder.

According to a further aspect of the present invention, there is provided a method for reconstructing a video sequence, including receiving a compressed video sequence, performing inverse quantization and inverse transform on the compressed video sequence, and reconstructing an intraframe, filtering the intraframe so that the intraframe is used as a reference frame in reconstructing interframes, and reconstructing the interframes by using a filtered version of the intraframe as a reference.

According to yet another aspect of the present invention, there is provided an apparatus for reconstructing the original video sequence from a compressed video sequence, the apparatus including a receiver receiving the compressed video sequence; a decoder reconstructing an intraframe by decoding the compressed video sequence, and a filter filtering the reconstructed intraframe so that the intraframe is used as a reference in reconstructing interframes, wherein the decoder reconstructs interframes by decoding the compressed video sequence using a filtered version of the intraframe as a reference.

According to still another aspect of the present invention, there is provided a method for filtering an image obtained by wavelet-based downsampling including performing wavelet-based upsampling on the image obtained by the wavelet-based downsampling, and downsampling an upsampled version of the image using a predetermined scheme.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings, in which exemplary embodiments of the invention are shown.

In the embodiments of the present invention, scalable video coding is used to generate bitstreams with various spatial resolutions and frame rates. That is, the scalable coding allows a single scalable bitstream to be partitioned into bitstreams having various spatial resolutions and frame rates.

Currently known scalable coding algorithms cannot ensure reconstruction of good quality video sequence at every resolution level. Thus, while the present invention basically uses a scalable video coding algorithm to perform video coding on a video sequence, it does not obtain video sequences with all resolutions and frame rates from a single scalable coded bitstream. In one embodiment, two or more scalable bitstreams are generated for a single video sequence. In another embodiment, a scalable bitstream and an MPEG-based bitstream are generated for a single video sequence. The generated bitstreams are combined together into a super bitstream.

Figure 1:
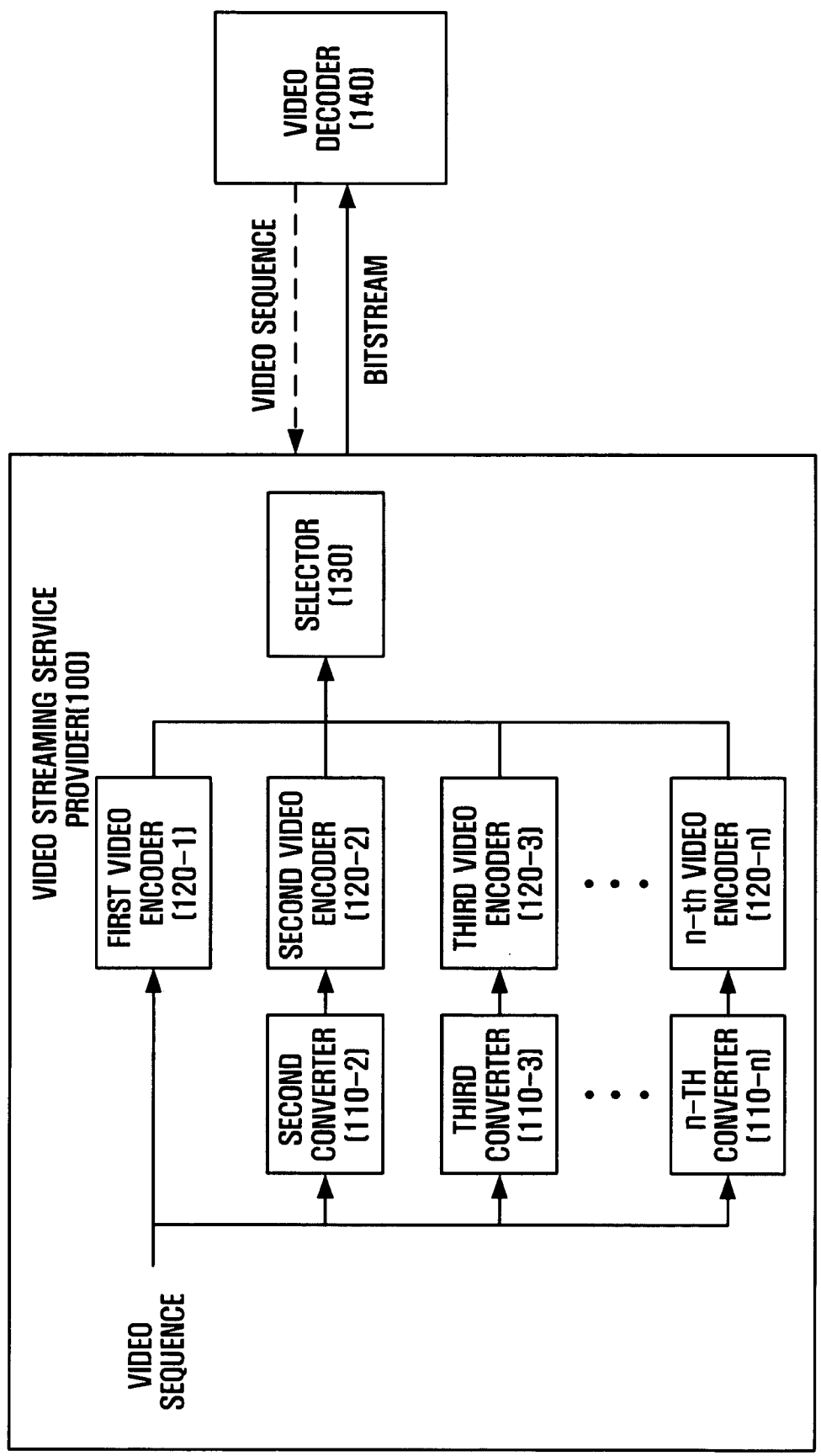
FIG. 1 illustrates the concept of a conventional video streaming service.
Figure 2:
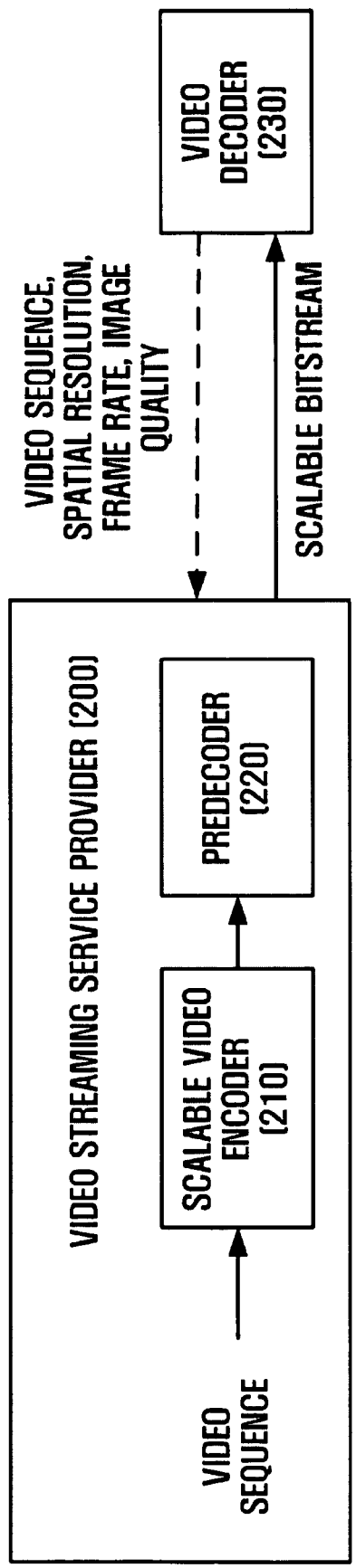
FIG. 2 illustrates the concept of another conventional video streaming service.
Figure 3:
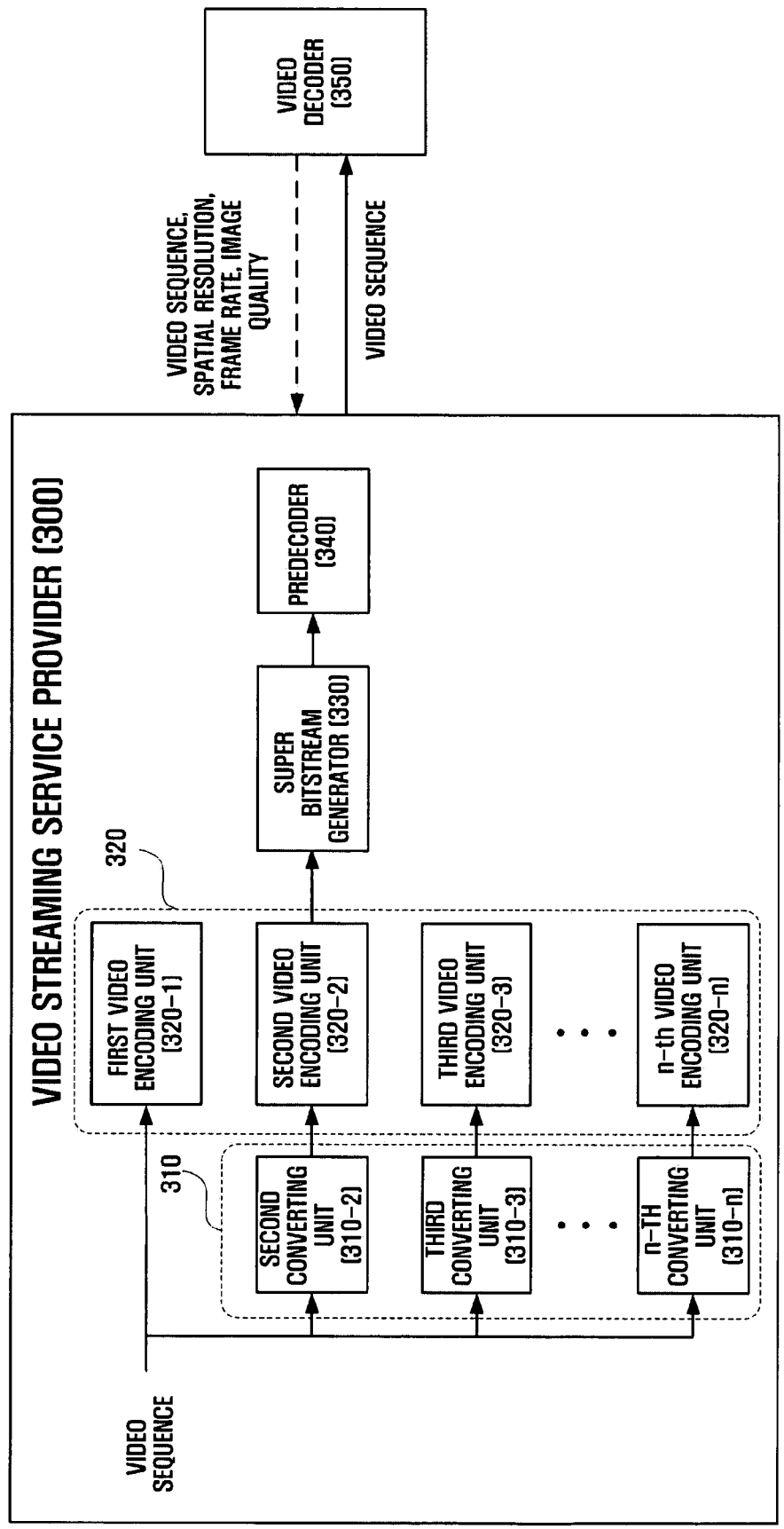
FIG. 3 illustrates the concept of a video streaming service according to an exemplary embodiment of the present invention.

FIG. 3 illustrates the concept of a video streaming service according to an embodiment of the present invention. It is assumed that a video streaming service is provided for a single video sequence (content).

Referring to FIG. 3, a video streaming service provider 300 generates a plurality of scalable bitstreams and combines them into a single super bitstream for transmission to a video decoder 350.

The video streaming service provider 300 includes a converter 310, a video encoder 320, a super bitstream generator 330, and a predecoder 340.

The video encoder 320 encodes a plurality of video sequences with different resolutions, frame rates, and image qualities into bitstreams. In one embodiment, the video encoder 320 uses only a scalable video coding algorithm to generate bitstreams from the video sequences. In another embodiment, the video encoder uses both scalable video coding scheme and a Discrete Cosine Transform (DCT)-based non-scalable video coding scheme to generate bitstreams.

As shown in FIG. 3, the video encoder 320 using only the scalable video coding scheme consists of first through n-th scalable video encoding units 320-1 through 320-$n$ that receive a number n of video sequences with different spatial resolutions and frame rates obtained by converting a single video sequence (content) and generate n bitstreams. The first through the n-th scalable video encoding units 320-1 through 320-$n$ may be separate devices or be integrated into a single device.

The first scalable video encoding unit 320-1 performs scalable video encoding on a video sequence at the highest spatial resolution and highest frame rate, and the second scalable video encoding unit 320-2 performs scalable video encoding at lower resolution and lower frame rate than the first scalable video encoding unit 320-1. In the same manner, the remaining scalable video encoding units 320-3 through 320-$n$ perform scalable video coding at different spatial resolutions and frame rates. Since reconstructing a video sequence with lower resolution than the generated scalable bitstream will degrade image quality more severely than with lower frame rate, it is desirable for each of the scalable video encoding units 320-1 through 320-n to generate a scalable bitstream with a different resolution.

A converter 310 that receives a video sequence converts the video sequence into video sequences having lower resolutions or lower frame rates. More specifically, a second converting unit 310-2 converts the video sequence into another video sequence with the same spatial resolution and frame rate as a scalable bitstream to be generated by the second scalable video encoding unit 320-2. Similarly, the remaining converting units 310-3 through 310-n respectively convert the video sequence into video sequences with different resolutions and frame rates for encoding in the third through the n-th scalable video encoding units 320-3 through 320-n. The video sequence can be converted into a lower resolution by either wavelet-based downsampling or MPEG-based downsampling. Alternatively, a frame may be downsampled using a wavelet-based method, a downsampled version of the frame may be upsampled using the wavelet-based method, and an upsampled version may be downsampled using an MPEG-based scheme. Wavelet-based downsampling means selecting a low-pass subband among low- and high-pass subbands obtained by spatially compressing an image with a wavelet-based method. This wavelet-based downsampling (upsampling) can also be performed with encoding operations by each of the scalable video encoding units 320-1 through 320-n.

The n video sequences are converted into n scalable bitstreams with different spatial resolutions and frame rates by the scalable video encoding units 320-1 through 320-n. The video streaming service provider 300 further includes the super bitstream generator 330 combining the generated n scalable bitstreams into a single super bitstream.

The predecoder 340 sends a bitstream with requested resolution and frame rate to the video decoder 350. In one embodiment, the predecoder 340 selects a bitstream with the requested resolution among the n bitstreams, truncates unnecessary bits so that the selected bitstream has the same frame rate as requested, and transmits the resulting bitstream to the video decoder 350. The predecoder 340 may receive a video sequence and a request for resolution and frame rate associated with the video sequence to be reconstructed directly from the video decoder 350 or from the video streaming service provider 300 that receives the video sequence and the request from the video decoder 350. To accomplish this, the predecoder 340 includes a request receiver (not shown) receiving the request and a bitstream truncating portion (not shown) cutting bits of a bitstream.

In another embodiment, the predecoder 340 selects a bitstream that matches the video sequence and the resolution and frame rate associated with the video sequence received by the request receiver among the super bitstream containing the n bitstreams, truncates the bitstreams other than the selected bitstream and unnecessary bits of the selected bitstream, and sends the resulting super bitstream to the video decoder 350. If a scalable bitstream with the requested resolution does not exist within the super bitstream, one of the higher resolution scalable bitstreams is selected and unnecessary bits of the selected bitstream are truncated for transmission to the video decoder 350. In this case, the selected scalable bitstream may have resolution closest to the requested resolution. Furthermore, if a scalable bitstream with the requested resolution and frame rate exists within the super bitstream, the predecoder 340 may convert the selected bitstream into a lower SNR bitstream by truncating the same before transmission to the video decoder 350.

In one embodiment, the predecoder 340 may be implemented separately from the video encoder 320. In this case, the predecoder 340 acts as the video streaming service provider 300. That is, the predecoder 340 receives a request for a video sequence with specific resolution and frame rate from the video decoder 350 and selects one among the super bitstream containing the plurality of previously encoded bitstreams, truncates some bits of the selected bitstream and the remaining bitstreams, and transmits the resulting super bitstream to the video decoder for reconstruction of the video sequence with the requested resolution and frame rate.

In another embodiment, the predecoder 340 may be located together with the video decoder 350 at the user side. In this case, the video decoder 350 that receives a super bitstream from the video streaming service provider 300 sends the super bitstream to the predecoder 340 that then selects a bitstream from the super bitstream and truncates some bits of the selected bitstream and the remaining unnecessary bitstreams in such a manner as to reconstruct a video sequence with the resolution and frame rate desired by the video decoder 350.

The above-described components are functional modules and perform the tasks described above. The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Figure 4A:
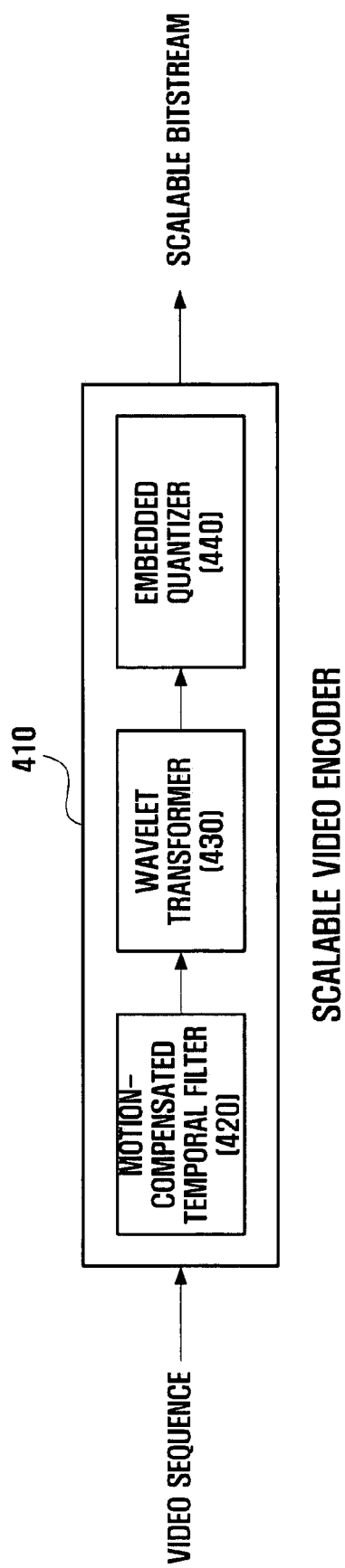
FIGS. 4A and 4B schematically shows the configurations of a scalable video encoder and an Advanced Video Coding (AVC) video encoder.
Figure 4B:
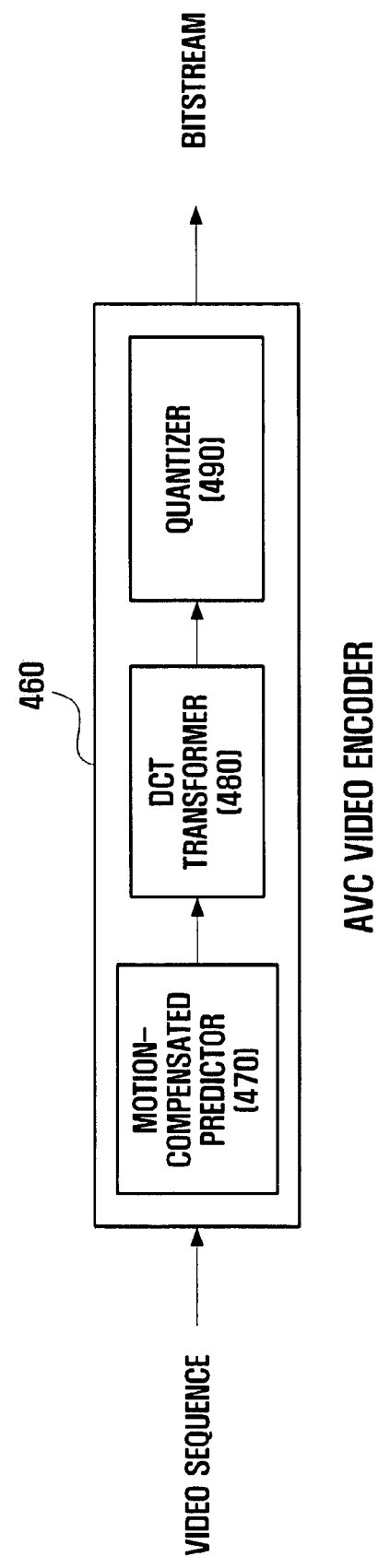

FIGS. 4A and 4B schematically show the configurations of a scalable video encoder 410 and an Advanced Video Coding (AVC) video encoder 460, respectively.

Referring to FIG. 4A, the video scalable encoder 410 includes a motion-compensated temporal filter 420, a wavelet transformer 430, and an embedded quantizer 440. The scalable video encoder 410 receives an input video sequence that is split into several groups of pictures (GOPs), each being the smallest encodable unit. A GOP consists of a plurality of frames, e.g., 2, 4, 8, 16, or 32 frames. Various algorithms known as the scalable video coding schemes provide higher video compression efficiency as the number of frames in a GOP ('GOP size') increases. However, increasing the GOP size also increases algorithm delay from video encoding to decoding. On the other hand, decreasing the GOP size decreases the algorithm delay at the expense of sacrificing compression efficiency.

The motion-compensated temporal filter 420 removes temporal redundancies between frames in each GOP using commonly known algorithms such as Motion Compensated Temporal Filtering (MCTF), Unconstrained MCTF (UMCTF), or Successive Temporal Approximation and Referencing (STAR). These algorithms not only remove temporal redundancies between frames but also achieve video coding that provides temporal scalability.

The wavelet transformer 430 converts the frames from which the temporal redundancies have been removed using a wavelet transform algorithm and removes spatial redundancies therefrom. The wavelet transform algorithm is also used in JPEG2000 standard, and decomposes a frame into low- and high-pass subbands. The low-pass subband image is similar to a reduced version of the original image.

The embedded quantizer 440 performs embedded quantization on transform coefficients obtained by applying wavelet transform on the frames. Entropy encoding is performed to convert the transform coefficients subjected to embedded quantization into a bitstream.

The present invention also uses another video coding algorithm to generate some or all of bitstreams for a video sequence. An AVC algorithm also known as H.264 or MPEG-4 Part 10 uses DCT for transformation and delivers the highest compression efficiency currently available. In the embodiment of the present invention using non-scalable video coding scheme, the AVC is desirable.

The AVC video encoder 460 includes a motion-compensated predictor 470, a DCT transformer 480, and a quantizer 490. The motion-compensated predictor 470 removes temporal redundancies present within frames making up a video sequence. The AVC supports various block sizes such as 4×4, 4×8, 8×4, 8×8, 16×8, 8×16, and 16×16 sub-blocks for removal of the temporal redundancies, thereby achieving high compression efficiency.

The DCT transformer 480 performs a DCT transform to divide each of the frames from which the temporal redundancies have been removed by the motion-compensated predictor 470 into a number of macroblocks. In contrast to the scalable video coding scheme using wavelet transform, the AVC scheme cannot support spatial scalability since it applies DCT transform to each macroblock. The quantizer 490 quantizes transform coefficients subjected to DCT, which is then entropy encoded into a bitstream. The video encoder 320 shown in FIG. 3 may include the scalable video encoder 410, the AVC video encoder 460, or other video encoders.

Meanwhile, a decoder (not shown) performs an inverse operation of the encoder 410 or 460 to reconstruct a video sequence. That is, the decoder that receives the bitstream (compressed video sequence) sequentially performs inverse quantization (or inverse embedded quantization), inverse spatial transform (wavelet transform or DCT transform), and inverse motion compensated temporal filtering or inverse motion compensated prediction on the bitstream to reconstruct a video sequence.

FIGS. 5A-5D respectively show video streaming services using a non-scalable coding scheme, scalable video coding scheme, and other coding schemes according to first and second embodiments of the present invention.

For a video streaming service using the non-scalable video coding scheme, a bitstream is required for each resolution and frame rate to provide a video sequence (content) to a user at various resolutions and frames rates. For example, to provide three kinds of video streaming services with 704×576 resolution and 60 Hz frame rate, 352×288 resolution and 30 Hz frame rate, and 176×144 resolution and 15 Hz frame rate, video coding is performed on a video sequence at the 704×576 resolution and 60 Hz frame rate, the 352×288 resolution and 30 Hz frame rate, and the 176×144 resolution and 15 Hz frame rate to generate first through third bitstreams 511 through 513, respectively. For example, when the user makes requests for the 704×576 resolution and 60 Hz frame rate, the 352×288 resolution and 30 Hz frame rate, and 176×144 resolution and 15 Hz frame rate, a video streaming service provider offers the first through third bitstreams 511 through 513 respectively having the 704×576 resolution and 60 Hz frame rate, the 352×288 resolution and 30 Hz frame rate, and the 176×144 resolution and 15 Hz frame rate.

Figure 5A:
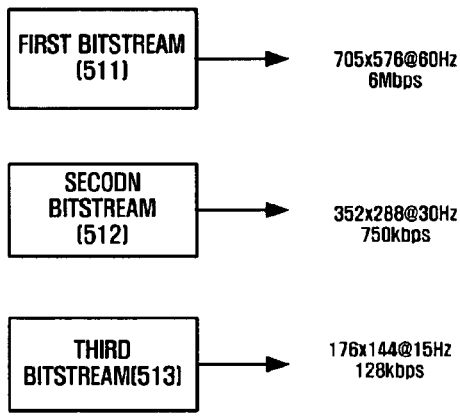
FIGS. 5A-5D show the comparison between video streaming services using non-scalable and scalable video coding schemes and other coding schemes according to embodiments of the present invention.

As shown in FIG. 5A, offering the first through third bitstreams 511 through 513, respectively, requires stable 6 Mbps, 750 Kbps, and 128 Kbps network bandwidths. Thus, the user should select a bitstream with resolution and frame rate to match the network bandwidth available. That is, when a stable network bandwidth of greater than 6 Mbps is ensured, the user is able to receive the video streaming services with the 704×576 resolution and 60 Hz frame rate, the 352×288 resolution and 30 Hz frame rate, and the 176×144 resolution and 15 Hz frame rate. On the other hand, when the available network bandwidth is greater than 750 Kbps but less than 6 Mbps, the user is able to receive only the video streaming services with the 352×288 resolution and 30 Hz frame rate and the 176×144 resolution and 15 Hz frame rate. Similarly, when a bandwidth of 128 Kbps is ensured, the user is able to receive only the video streaming service with the 176×144 resolution and 15 Hz frame rate.

When a stable bandwidth of 5 Mbps is available, the user cannot receive the video streaming service with the 704×576 resolution and 60 Hz frame rate. Thus, to satisfy user's need for higher resolution and frame rate, the video streaming service provider needs to encode a video sequence at resolution and frame rate optimized for the 5 Mbps bandwidth. That is, the streaming service using the non-scalable video coding algorithm poses a limitation in that video coding must be performed for each resolution and frame rate in order to provide video streaming services with various resolutions and frame rates according to network condition or user's preference. An alternative solution to this limitation using a scalable video coding algorithm will now be described.

Figure 5B:
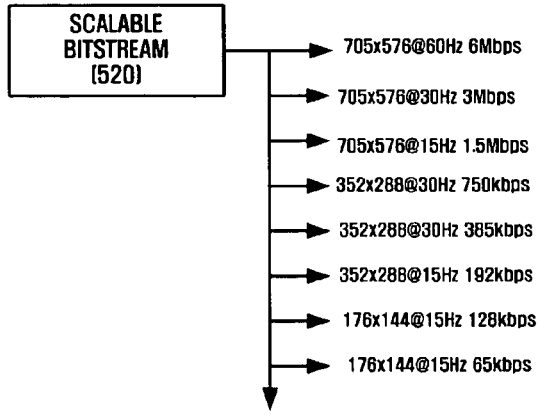

Referring to FIG. 5B, for a scalable video streaming service, a single scalable bitstream 520 is generated for a single content (video sequence). The scalable bitstream 520 may be easily predecoded by a predecoder into a bitstream with either or both of lower resolution and lower frame rate.

For example, the scalable bitstream 520 with 704×576 resolution and 60 Hz frame rate requiring a 6 Mbps bandwidth may be predecoded into a bitstream with a frame rate of 30 Hz or 15 Hz without a change in the resolution.

Furthermore, the scalable bitstream 520 with 704×576 resolution and 60 Hz frame rate requiring a stable 6 Mbps bandwidth may be predecoded into a bitstream with lower resolution and lower frame rate, e.g., a bitstream with 352×288 resolution and 30 Hz frame rate requiring a stable 750 Kbps bandwidth, a bitstream with 352×288 resolution and 15 Hz frame rate requiring a stable 192 Kbps bandwidth, or a bitstream with 176×144 resolution and 15 Hz frame rate requiring a stable 128 Kbps bandwidth.

In addition, the scalable bitstream 520 may be predecoded into a lower image quality bitstream without changes in resolution and frame rate. For example, when the scalable bitstream 520 is converted into a bitstream with the 352×288 resolution and 30 Hz frame rate requiring a stable bandwidth of 384 Kbps before transmission to the user, a video sequence reconstructed from the bitstream has lower image quality than from a bitstream with the same resolution and frame rate but requiring a 750 Kbps bandwidth. Similarly, the scalable bitstream may be converted into a bitstream with the 176×144 resolution and 15 Hz frame rate requiring a stable 128 Kbps bandwidth or a lower quality bitstream with the same resolution and frame rate requiring a stable 64 Kbps bandwidth before transmission to the user.

In contrast to the video streaming service using the non-scalable video coding algorithm shown in FIG. 5A, the video streaming service using the scalable video coding algorithm enables transmission of bitstreams with various resolutions, frame rates, and image qualities using the single scalable bitstream 520. That is, using the scalable video coding algorithm makes it easy to provide various video streaming services according to a network condition or performance of a user's device. However, the currently known scalable video coding algorithms cannot obtain good quality reconstructed video sequences at all resolutions. For example, the scalable video coding algorithm may obtain good quality reconstructed video sequence at the 704×576 resolution, but not at the 176×144 resolution.

To solve this problem, the video streaming service according to the first embodiment of the present invention uses a coding scheme that involves generating a plurality of scalable bitstreams and combining them together into a single super bitstream instead of predecoding a scalable bitstream in order to provide a video sequence at various resolutions, frame rates, and image qualities.

Figure 5C:
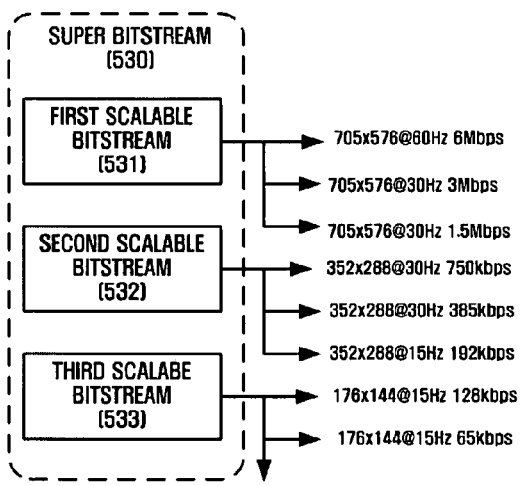

Referring to FIG. 5C, first through third scalable bitstreams 531 through 533 are generated at different resolutions from a single video sequence and then combined into a super bitstream 530. Alternatively, one or a plurality of scalable bitstreams with different resolutions and one or a plurality of non-scalable bitstreams may be generated for the single video sequence, which will be described later with reference to FIG. 5D.

The first scalable bitstream 531 is generated from a video sequence at the highest resolution and frame rate (e.g., 704×576 resolution and 60 Hz frame rate). The second scalable bitstream 532 is generated from the same video sequence at lower resolution and lower frame rate than the first scalable bitstream 531 (e.g., 352×288 resolution and 30 Hz frame rate). The third bitstream has the lowest resolution and frame rate (176×144 resolution and 15 Hz frame rate). In one embodiment, when a user requests transmission of a frame with 352×288 resolution over a available bandwidth of 384 Kbps, the second scalable bitstream 530 is converted into a lower quality bitstream with the same resolution and frame rate by truncating unnecessary bits of the second scalable bitstream 530 with a predecoder before transmission to the user.

Of course, the bitstream with the 352×288 resolution and the 30 Hz frame rate to be transmitted over the 384 Kbps bandwidth can be obtained from the first scalable bitstream 531. However, the resulting bitstream may have lower quality than that obtained from the second scalable bitstream 532. While it is described that the resolutions and frame rates of the second and third scalable bitstreams 532 and 533 are half, quarter, and eighth that of the first scalable bitstream 531, they may be a third or sixth of the same.

In another embodiment, the first and second scalable bitstreams 531 and 532 may respectively have 704×576 and 600×480 resolutions. In this case, the bitstream with a 352×288 resolution may be obtained by predecoding the first scalable bitstream 531 while a bitstream with a 300×240 resolution may be obtained by predecoding the second scalable bitstream 532.

The video streaming service shown in FIG. 5C employs scalable video coding to achieve scalability and uses a plurality of scalable bitstreams to reduce degradation in image quality compared to the video streaming service shown in FIG. 5B in which a single bitstream is converted into bitstreams with various resolutions and frame rates. Thus, using the coding scheme according to the first embodiment of the present invention allows a video streaming service for a video sequence at various resolutions, frames rates, and image qualities, which is called simulcasting, while ensuring the appropriate and acceptable image quality for each resolution level.

Figure 5D:
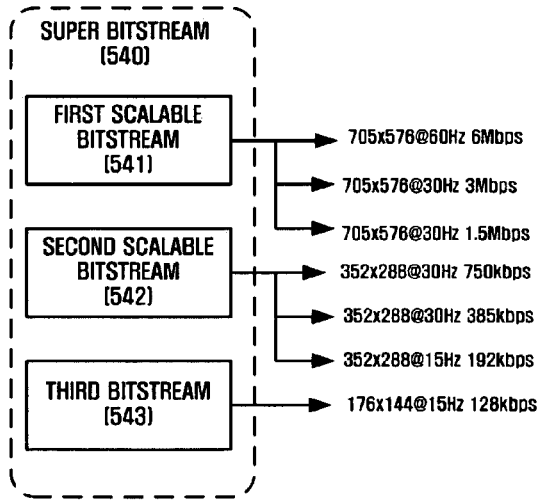

Referring to FIG. 5D, the coding scheme according to the second embodiment is used to generate a plurality of bitstreams containing a non-scalable bitstream. That is, a super bitstream 540 consists of first and second scalable bitstreams 541 and 542 and a third non-scalable bitstream 543. While the first and second scalable bitstreams 541 and 542 are generated using a scalable video coding scheme, the third bitstream 543 is generated using a non-scalable video coding scheme such as AVC.

Meanwhile, the video streaming services according to the embodiments of the present invention require more data storage space than using the single scalable video stream shown in FIG. 5B. A method for reducing this overhead will now be described with reference to FIGS. 6 and 7, assuming that a super bitstream contains two scalable bitstream.

Figure 6:
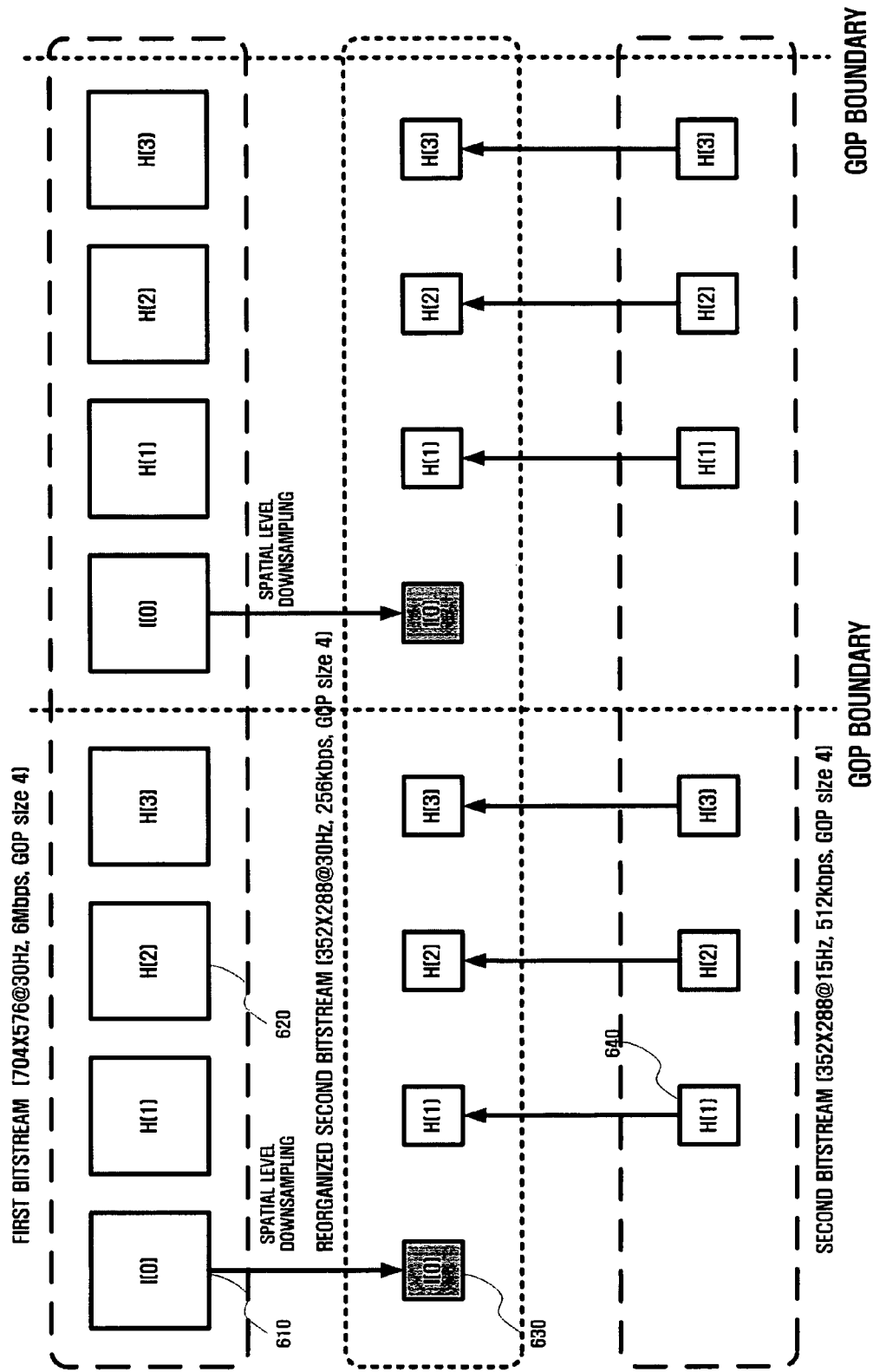
FIG. 6 is a diagram for explaining sharing of an intraframe according to a first embodiment of the present invention.

FIG. 6 is a diagram for explaining sharing of an intraframe according to a first embodiment of the present invention. Frames in the video sequence used in video coding can be divided into intraframes encoded without reference to another frame and interframes encoded using another frame as a reference. An intraframe is also called an I frame in STAR-based scalable video coding or MPEG video coding or an A frame in UMCTF-based scalable video coding. MPEG video coding uses two types of interframes—predictive (P) frame coded using one frame as a reference and bi-directional (B) frame coded using two frames as a reference. An interframe is also called an H frame in scalable video coding.

FIG. 6 shows a first bitstream with the highest resolution (704×576) consisting of an intraframe 610 and three interframes 620. FIG. 6 shows a second bitstream with 352×288 resolution sharing the intraframe 610 with the first bitstream. The second bitstream consists of only interframes 640. FIG. 6 shows a second bitstream reorganized with the first bitstream and the second bitstream. The reorganized second bitstream consists of an intraframe 630 obtained from the shared intraframe 610 in the first bitstream and the interframes 640 in the second bitstream.

Sharing the intraframe 610 between the first and second bitstreams means that the second bitstream does not contain any intraframe, and the shared intraframe 610 is used in reconstructing a video sequence from the second bitstream. That is, a super frame contains the first and second bitstreams of FIG. 6, and upon receipt of a request for a video sequence having 352×288 resolution, a video streaming service provider creates the reorganized second bitstream reorganized by truncating bitstreams other than the intraframe 610 in the first bitstream and the second bitstream.

Figure 7:
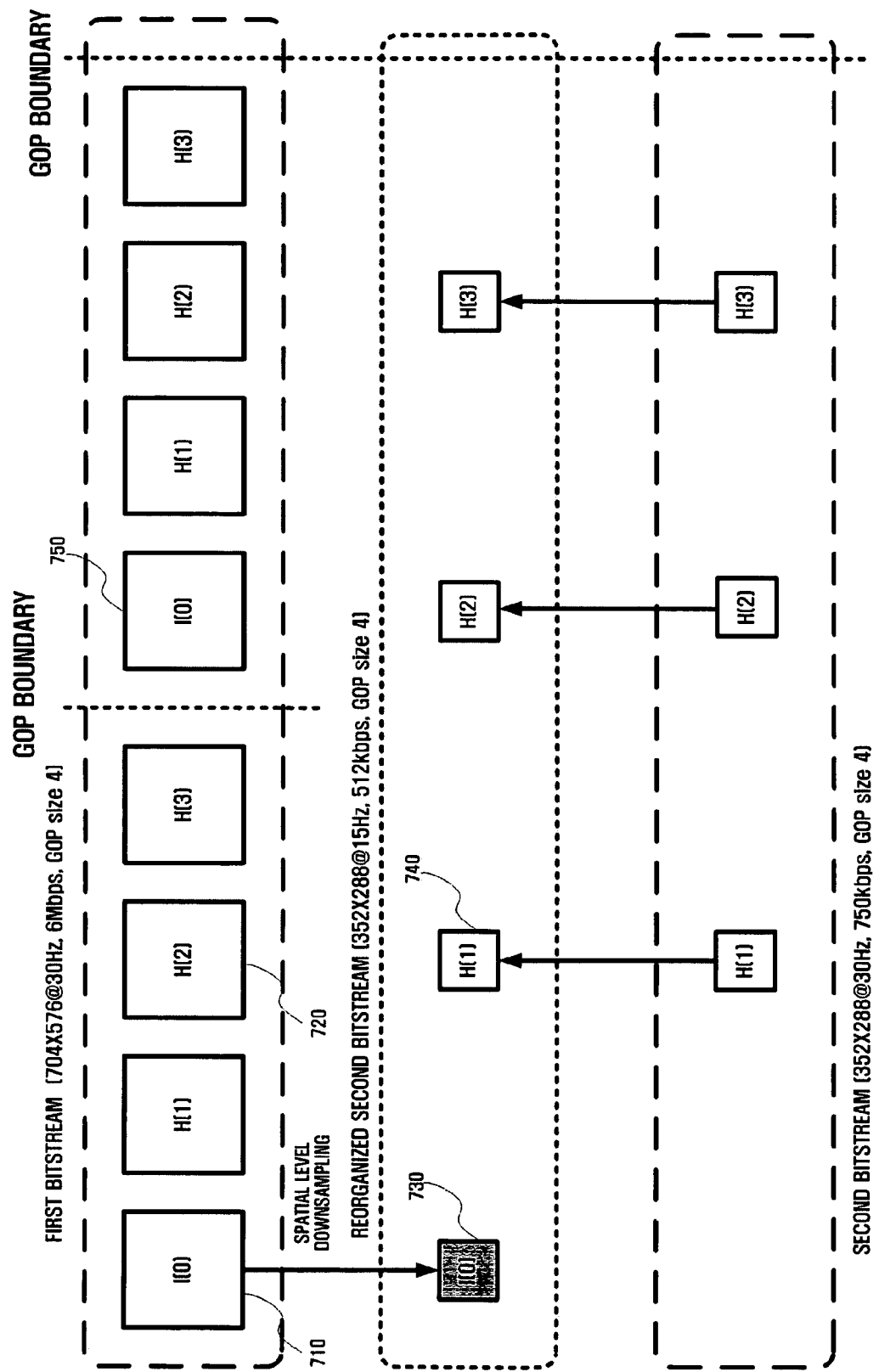
FIG. 7 is a diagram for explaining sharing of an intraframe according to a second embodiment of the present invention.

FIG. 7 is a diagram for explaining sharing of an intraframe according to a second embodiment of the present invention. The difference from the first embodiment is that a second bitstream of FIG. 7 has a lower frame rate than a first bitstream of FIG. 7. The low resolution bitstream has a lower frame rate than, but the same GOP size as, the high resolution bitstream. In other words, the number of intraframes in a reorganized second bitstream of FIG. 7 is minimized by increasing the time interval between successive GOPs. Thus, since the number of intraframes in the reorganized second bitstream of FIG. 7 being transmitted after predecoding is decreased compared to that in the reorganized second bitstream of FIG. 6, it is possible to provide a video streaming service with a smaller bandwidth. Referring to FIG. 7, the time interval between GOPs in the second bitstream is twice as long as that in the first bitstream since the second bitstream has a half frame rate of the first bitstream but the same number of frames in each GOP as the first bitstream. In this case, an H(2) frame in the second bitstream is obtained by intercoding. Like in the first embodiment, the second bitstream shares an intraframe 710 with the first bitstream for every two GOPs of the first bitstream. A super bitstream contains the first and second bitstreams. Upon receipt of a request for a video sequence having 352×288 resolution, a video streaming service provider creates an intraframe 730 by truncating some bits of the shared intraframe 710 and the reorganized second bitstream consisting of the intraframe 730 and the interframes 740 in the second bitstream by truncating interframes 720 and an unshared intraframe 750 in the first bitstream, and then transmits the reorganized second bitstream to a video decoder. While it is described above that the number of intraframes in a bitstream being transmitted is adjusted using both the time interval between GOPs and sharing of an intraframe, it may be adjusted only by changing the time interval between GOPs in bitstreams according to a frame rate without sharing any intraframe.

Sharing an intraframe as shown in FIGS. 6 and 7 is an efficient way for removing redundancies between a plurality of bitstreams having different resolutions and (or) frame rates. Since the technique according to the first or second embodiment of the present invention is usually performed independently of a video coding algorithm, it can apply to most scalable video coding algorithms using both intraframe and interframe coding schemes.

While it is described above that an intraframe in a reorganized second bitstream is obtained by truncating some bits of an intraframe in a first bitstream in order to downsample or lower the resolution, it is possible to obtain the reorganized second bitstream consisting of the intraframe in the first bitstream and interframes in the second bitstream while maintaining the resolution of the intraframe in the first bitstream. This method is useful in non-scalable AVC video coding algorithms in which it is difficult to adjust the resolution of a frame. When the first and second bitstreams of FIG. 7 are generated using AVC video coding, the reorganized second bitstream may be composed of the intraframe 710 in the first bitstream and the interframes 740 in the second bitstream. In this case, the video decoder reconstructs and downsamples the intraframe 710 and uses the interframe as a reference frame in reconstructing the interframes 740.

As described above, a single video sequence is converted into at least one video sequence with different resolutions that are then encoded into scalable bitstreams using scalable video coding, and all or some of the scalable bitstreams (excluding an intraframe) are combined into a super bitstream. A scalable video coding algorithm obtains a low resolution video sequence from a low-pass subband in a wavelet transformed frame. In practice, a low resolution frame obtained by performing wavelet transform tends to be a sharp image, which makes MCTF difficult, thus degrading video coding efficiency. Thus, conventional MPEG-based downsampling may be used to get a softer low-resolution video sequence. In this case, for optimal combination of the MPEG-based downsampling with a wavelet-based method, a frame may be downsampled and upsampled using the wavelet-based method and then downsampled using the MPEG-based video coding.

Meanwhile, in the first and second embodiments of the present invention shown in FIGS. 6 and 7, a video sequence obtained by performing wavelet-based downsampling on a video sequence used to generate the first bitstream is encoded into the second bitstream using scalable video coding. In this case, to provide a video streaming service at a second resolution (352×288), the video streaming service provider truncates unnecessary bits of the super bitstream, leaving the second bitstream containing no intraframe and the entire interframe or a portion thereof contained in the first bitstream. Then, to obtain a second resolution intraframe from the intraframe in the first bitstream, the video streaming service provider removes high-pass subbands from a first resolution (704×576) intraframe consisting of four subbands (one low-pass subband and three high-pass subbands) with the second resolution obtained by performing wavelet transform. However, since downsampling each frame in the video sequence using the MPEG-based scheme results in softer images than wavelet-based downsampling, generating the second bitstream from a video sequence obtained by MPEG-based downsampling may provide better coding efficiency and improved image quality than from a video sequence obtained by wavelet-based downsampling.

In this case, a video sequence may be generated for video coding by using both wavelet-based downsampling and MPEG-based downsampling, rather than by using only MPEG-based downsampling. That is, a frame may be downsampled to a lower resolution and upsampled to a higher resolution using a wavelet-based method, and then downsampled to a lower resolution using an MPEG-based scheme. The details of this method will now be described with reference to FIG. 8.

Figure 8:
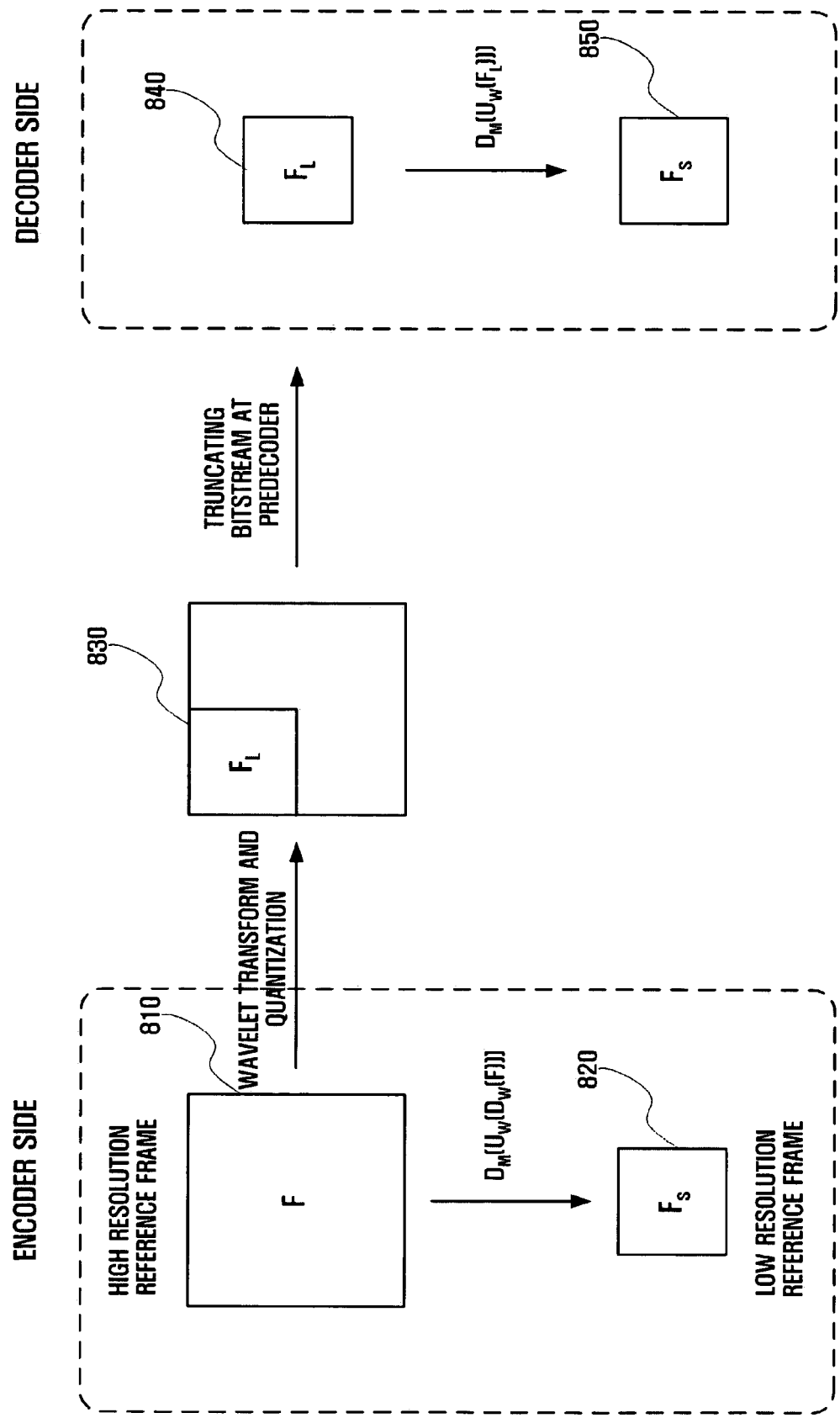
FIG. 8 is a diagram for explaining a method for generating a smooth reference frame according to an embodiment of the present invention.

FIG. 8 is a diagram for explaining a method for generating a smooth reference frame according to an embodiment of the present invention.

In FIG. 8, D and U respectively denote downsampling and upsampling, and subscripts W and M respectively denote wavelet- and MPEG-based schemes. F, $F_S$, and $F_L$ respectively represent high resolution frame, low resolution frame, and a low-pass subband in the high resolution frame.

In order to obtain a low resolution bitstream, a video sequence is first downsampled to a lower resolution and then the downsampled version is upsampled to a higher resolution using a wavelet-based method, followed by MPEG-based downsampling. A low resolution video sequence obtained by performing the MPEG-based downsampling is then encoded using scalable video coding. When a low resolution frame $F_S$ is an intracoded frame, the low resolution frame FS is not contained in a bitstream (super bitstream) but obtained from a high resolution intraframe F contained in the super bitstream. That is, to obtain the smooth low resolution intraframe $F_S$, the high resolution intraframe F is downsampled and then upsampled using the wavelet-based scheme to obtain approximation of the original high resolution interframe F, followed by MPEG-based downsampling. The high-resolution intraframe F is subjected to wavelet transform and quantization and then combined into the super bitstream. Some bits of the super bitstream are truncated by a predecoder before transmission to a decoder. By truncating high-pass subbands of the high resolution intraframe F, a low-pass subband $F_L$ in the high resolution intraframe F is obtained. In other words, the low-pass subband $F_L$ is a downsampled version DW(F) of the high resolution intraframe F. The decoder that receives the low-pass subband $F_L$ upsamples it using the wavelet-based method and downsamples an upsampled version using the MPEG-based scheme, thus obtaining a smooth intraframe.

The concept is generalized as follows. After obtaining a low resolution video sequence from a high resolution video sequence using a downsampling scheme A, the high resolution and low resolution video sequences are respectively encoded into high resolution and low resolution bitstreams that are then combined into a super bitstream. In this case, the super bitstream consists of all frames in the high resolution bitstream and only interframes (excluding an intraframe) in the low resolution bitstream. In order to reconstruct a low resolution video sequence from the low resolution super bitstream, unnecessary bits of the super bitstream are truncated. The unnecessary bits include interframes, an unshared intraframe, and high-pass subbands of a shared intraframe in the high resolution bitstream. After truncation, low-pass subbands of the shared intraframe in the high resolution bitstream and the interframes in the low resolution bitstream are left in the super bitstream. After reconstructing an intraframe from the low-pass subbands in the received super bitstream, a video decoder upsamples the reconstructed intraframe and downsamples an upsampled version using the scheme A, thus creating a reference frame to be used in reconstructing low resolution interframes. Here, the downsampling scheme A may be MPEG-based downsampling filtering described in Doc. N3908, or a bicubic filter commonly used in image filtering.

This technique applies to coding of videos as well as still images. For example, to make a sharp image obtained by wavelet-based downsampling look softer, the image may be upsampled using a wavelet-based scheme and then downsampled using an MPEG-based scheme.

Figure 9:
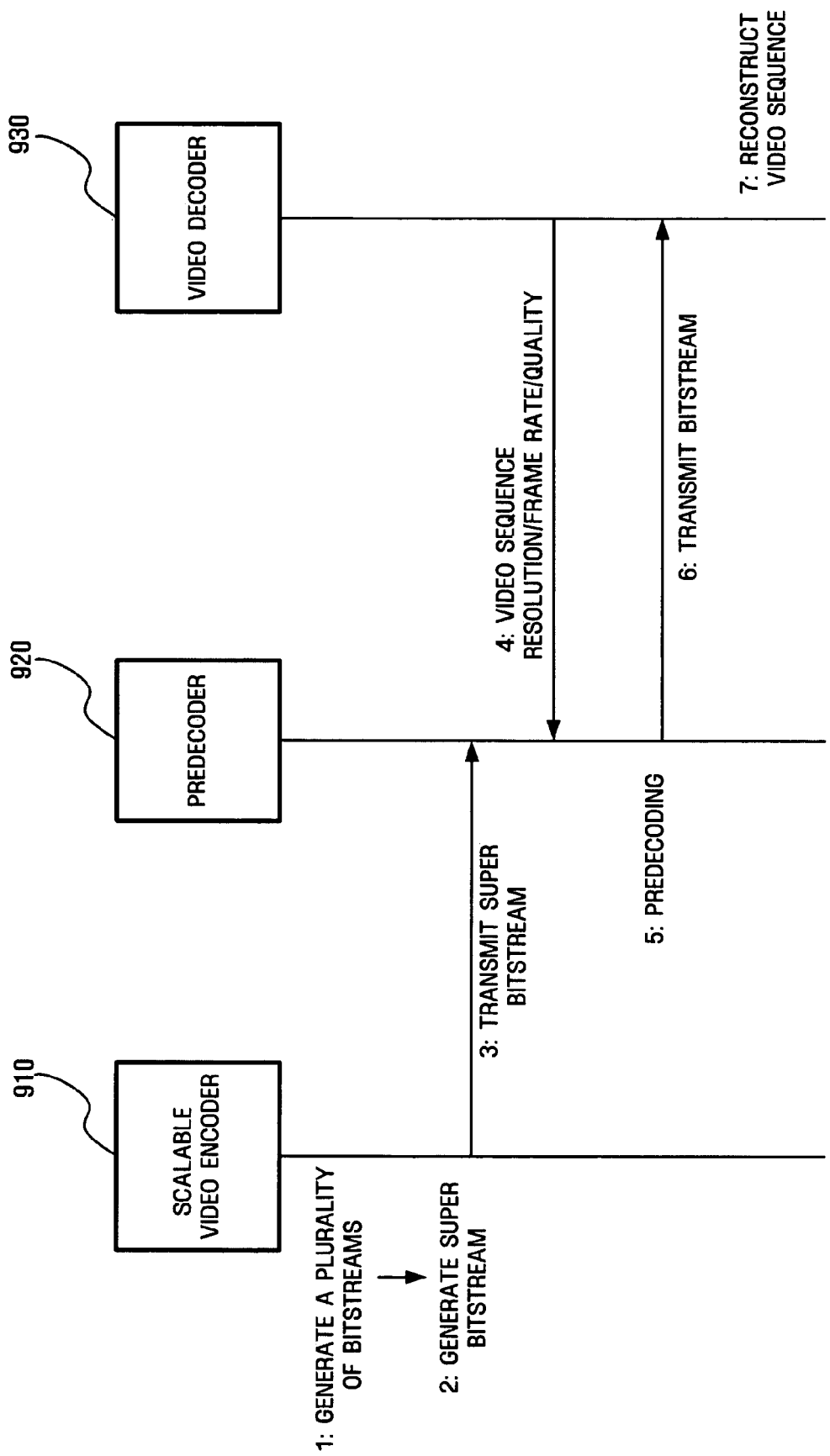
FIG. 9 illustrates a process for providing a video streaming service according to an embodiment of the present invention.

FIG. 9 illustrates a process for providing a video streaming service according to an embodiment of the present invention.

Referring to FIG. 9, the process includes the following steps:

1. In the illustrative embodiment, a scalable video encoder 910 converts a single video sequence into a plurality of video sequences with various resolutions and (or) frame rates and encodes the plurality of video sequences into a plurality of scalable bitstreams.

2. The plurality of scalable bitstreams are combined together into a single super bitstream. The structure of the super bitstream will be described in more detail later with reference to FIG. 10.

3. The super bitstream is transmitted to a predecoder 920.

4. A user using a video decoder 930 requests a video sequence, and resolution, frame rate and image quality associated with the video sequence. The steps 3 and 4 may be performed in a reverse order.

5. The predecoder 920 that receives the request for resolution, frame rate, and image quality truncates unnecessary bits of the super bitstream according to the request.

6. Then, the predecoder transmits the resulting super bitstream to the video decoder 930.

7. The video decoder reconstructs a video sequence from the received super bitstream.

The location of the predecoder 920 may vary depending on the type of video streaming services. In one embodiment, when the predecoder 920 is located at the video streaming service provider side, the video streaming service provider includes the scalable video encoder 910 and the predecoder 920. Upon receipt of a request for a video sequence and resolution, frame rate and image quality associated with the video sequence from the user using the video decoder 930, the predecoder 920 predecodes the super bitstream corresponding to the video sequence for transmission to the video decoder 930. Thus, the super bitstream from which unnecessary bits have been removed are transmitted across a network between the streaming service provider and the user.

In another embodiment, the video streaming service provider includes the predecoder 920 and receives a super bitstream from a content provider including the scalable video encoder 910. The super bitstream can be transmitted online on a wired or wireless basis or offline through a storage medium. The received super bitstream is stored in a storage device (not shown) at the video streaming service provider. Upon receipt of a request for a video sequence from the user using the video decoder 930, the video streaming service provider searches the storage device for a super bitstream that matches the requested video sequence, and truncates unnecessary bits of the found super bitstream for transmission to the user.

In yet another embodiment, the predecoder 920 is located at the user side. When the video streaming service provider also includes the predecoder 920, the predecoder 920 operates in the same manner as when it is located at the video streaming service provider side. When the video streaming service provider does not include the predecoder 920, the scalable video encoder 910 at the video streaming service provider side generates a super bitstream from a video sequence. Upon receiving a user's request for a video sequence, the video streaming service provider transmits a super bitstream corresponding to the video sequence to the user on a wired or wireless basis.

In a further embodiment, the predecoder 920 truncates unnecessary bits of the super bitstream according to the desired resolution, frame rate, and image quality and reconstructs the video sequence from the resulting super bitstream. When the video sequence with the desired resolution and frame rate does not exist in the super bitstream, bits of the remaining bitstreams excluding one of higher resolution and frame rate bitstreams are truncated. The selected bitstream may have resolution closest to the desired resolution.

Figure 10:
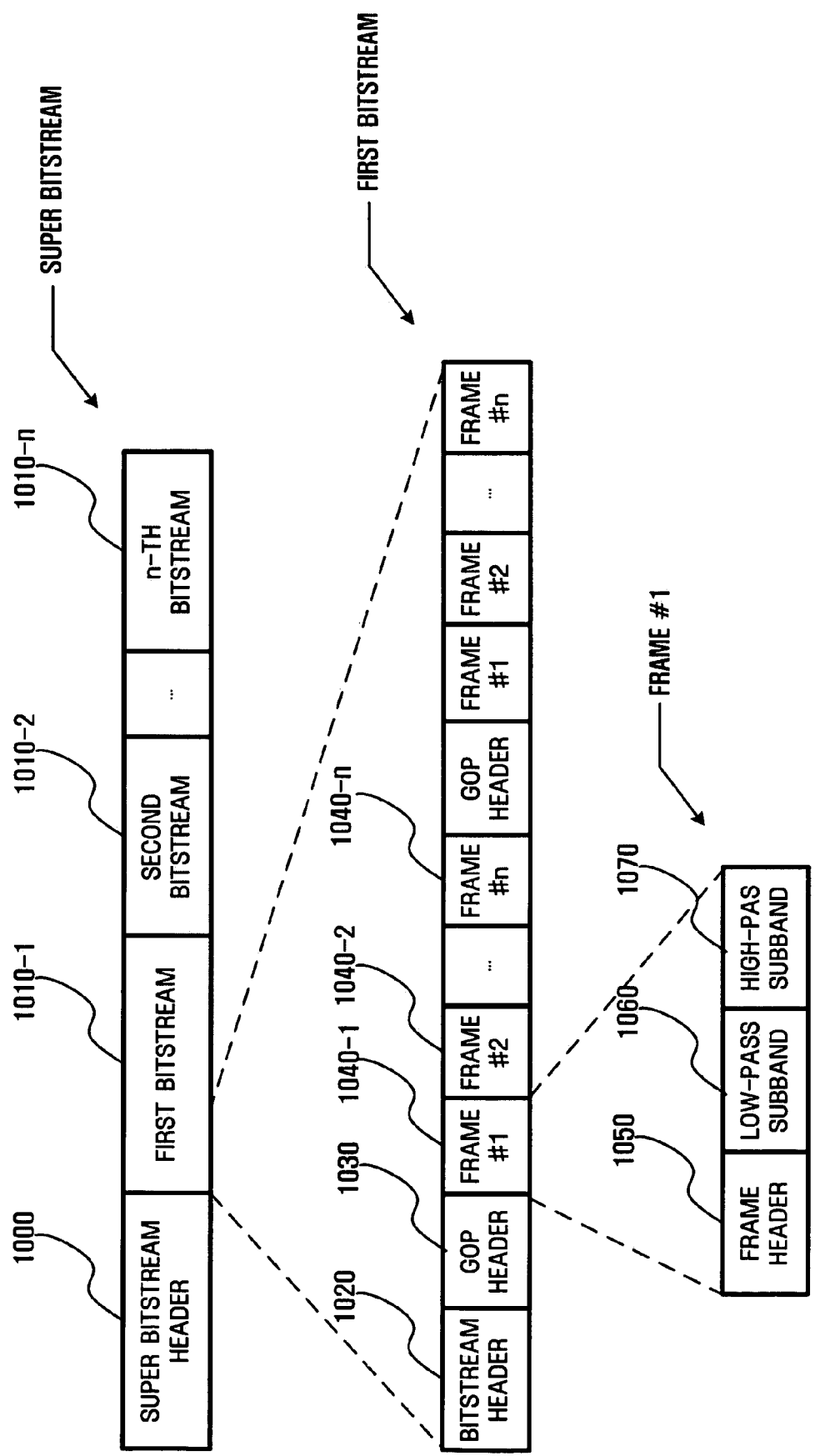
FIG. 10 shows the structure of a super bitstream according to an embodiment of the present invention.

FIG. 10 shows the structure of a super bitstream according to an embodiment of the present invention.

To obtain a super bitstream, one video sequence is first converted into a plurality of video sequences with various resolutions that are then compressed into a plurality of bitstreams using a scalable video coding scheme. The plurality of bitstreams are combined together into a super bitstream. Each bitstream contains motion vectors obtained during video compression and information on wavelet coefficients which have been subjected to embedded quantization.

The super bitstream is composed of a super bitstream header 1000 and first through n-th bitstreams 1010-1 through 1010-n. The super bitstream header 1000 contains various necessary information on the super bitstream. For example, the information may include the number of bitstreams in the super bitstream and information about sharing of an intraframe.

The first bitstream 1010-1 contains information obtained by encoding the original highest resolution video sequence. A bitstream header 1020 contains various necessary information on the first bitstream including length, resolution, frame rate, and the number of GOPs. A GOP header 1030 contains GOP information such as the number of frames in each GOP or a GOP size. The GOP header 1030 is followed by frame #1 through frame #n (1040-1 through 1040-n). When one GOP ends, the next GOP also begins with a GOP header followed by frames.

The frame #1 1040-1 is the first frame of a GOP that is an intracoded frame (called an I frame or an A frame) in most scalable video coding algorithms. A frame header 1050 contains information specifying the type of the frame and necessary information about the frame such as length, followed by a low-pass subband 1060 and a high-pass subband 1070. The low-pass subband 1060 represents a texture image obtained by performing embedded quantization on a low-frequency component (LL image) obtained by applying wavelet transform to the frame. The high-pass subband 1070 represents a texture image obtained by performing embedded quantization on high frequency components (LH and HH images) obtained using the wavelet transform. The frame #1 1040-1 further includes motion vector information (not shown).

In connection with the structure of the super bitstream, sharing of a low frequency intraframe as shown in FIGS. 6 and 7 will now be described. The first bitstream 1010-1 with the highest resolution contains information about all frames in the original video sequence, while the second bitstream 1010-2 with lower resolution contains no intraframes. The super bitstream can be preceded into the second bitstream 1010-2 in various ways. In one embodiment, the remaining portions of the super bitstream excluding intraframes of the first bitstream 1010-1 and the second bitstream 1010-2 are truncated. After reconstructing and downsampling intraframes of the first bitstream, the frames of the second bitstream are reconstructed at a decoder side.

In another embodiment, remaining portions of the super bitstream excluding the intraframes of the first bitstream 1010-1 and the second bitstream 1010-2 are truncated, and high-pass subbands from each of the intraframes in the first bitstream 1010-1 are truncated. In a decoder part, the remaining low-pass subbands of intraframe in the first bitstream 1010-1 are reconstructed, and the reconstructed low-pass subbands are then upsampled and downsampled in order to create a reference frame used in reconstructing other interframes. The latter method reduces the amount of data in a bitstream being transmitted to the decoder side compared to the former.

In concluding the detailed description, those skilled in the art will appreciate that many variations and modifications can be made to the exemplary embodiments without substantially departing from the principles of the present invention. While the present invention has been particularly shown and described with reference to a video streaming service provider using a plurality of scalable video coding algorithms, video streaming services may be delivered using a combination of scalable and non-scalable video coding schemes. Therefore, the disclosed exemplary embodiments of the invention are used in a generic and descriptive sense only and not for purposes of limitation. It is to be understood that various alterations, modifications and substitutions can be made therein without departing in any way from the spirit and scope of the present invention, as defined in the claims which follow.

As described above, the present invention enables video coding for simulcasting with good image quality and high video coding efficiency and video streaming services using the video coding.

In addition, according to the present invention, the efficiency of a video coding algorithm for the video streaming services can be improved.

Further, the present invention improves the quality of a video stream as well as individual (still) images such as provided by video streaming services.

What is claimed is:

1. A method for reconstructing a video sequence, comprising:
   receiving a compressed video sequence, performing inverse quantization and inverse transform on the compressed video sequence, and reconstructing an intraframe;
   filtering the intraframe so that the intraframe is used as a reference frame in reconstructing interframes; and
   reconstructing the interframes by using a filtered version of the intraframe as a reference,
   wherein the compressed video sequence is a second super bitstream having a requested resolution, frame rate, and image quality,
   wherein the second super bitstream is obtained from a first super bitstream including a plurality of bitstreams by selecting a bitstream that matches the requested resolution and frame rate and truncating a remaining bitstream excluding the selected bitstream and a bitstream sharing intraframes with the selected bitstream and unnecessary bits of the selected bitstream and the bitstream sharing the intraframes.

2. The method of claim 1, wherein the filtering of the intraframe is performed by downsampling or upsampling the intraframe.

3. The method of claim 1, wherein the filtering of the intraframe is performed by upsampling the reconstructed intraframe using a wavelet-based method and downsampling an upsampled version of the intraframe using an MPEG-based scheme.

4. An apparatus for reconstructing an original video sequence from a compressed video sequence, the apparatus comprising:
   a receiver receiving the compressed video sequence;
   a decoder reconstructing an intraframe by decoding the compressed video sequence; and
   a filter filtering the reconstructed intraframe so that the intraframe is used as a reference in reconstructing interframes,
   wherein the decoder reconstructs interframes by decoding the compressed video sequence using a filtered version of the intraframe as a reference,
   wherein the compressed video sequence is a second super bitstream having a requested resolution, frame rate, and image quality,
   wherein the second super bitstream is obtained from a first super bitstream including a plurality of bitstreams by selecting a bitstream that matches the requested resolution and frame rate and truncating a remaining bitstream excluding the selected bitstream and a bitstream sharing intraframes with the selected bitstream and unnecessary bits of the selected bitstream and the bitstream sharing the intraframes.

5. The apparatus of claim 4, wherein the filter performs filtering by downsampling or upsampling the reconstructed intraframe.

6. The apparatus of claim 5, wherein the reconstructed intraframe is upsampled using a wavelet-based method and an upsampled version of the intraframe is downsampled using an MPEG-based scheme.

7. The apparatus of claim 6, wherein the decoder reconstructs an intraframe by performing inverse quantization on the compressed video sequence and inverse spatial transform on transform coefficients obtained by performing the inverse quantization, the filter filtering the reconstructed intraframe, and the decoder reconstructs interframes using a filtered version of the intraframe as a reference after performing the inverse quantization on the compressed video sequence and the inverse spatial transform on the transform coefficients obtained by performing the inverse quantization.

* * * * *